(12) United States Patent
Ohtsuka

(10) Patent No.: US 11,280,604 B2
(45) Date of Patent: Mar. 22, 2022

(54) FILM THICKNESS MEASUREMENT DEVICE, FILM THICKNESS MEASUREMENT METHOD, FILM THICKNESS MEASUREMENT PROGRAM, AND RECORDING MEDIUM FOR RECORDING FILM THICKNESS MEASUREMENT PROGRAM

(71) Applicant: HAMAMATSU PHOTONICS K.K., Hamamatsu (JP)

(72) Inventor: Kenichi Ohtsuka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 60 days.

(21) Appl. No.: 16/959,683

(22) PCT Filed: Oct. 1, 2018

(86) PCT No.: PCT/JP2018/036697
§ 371 (c)(1),
(2) Date: Jul. 2, 2020

(87) PCT Pub. No.: WO2019/138614
PCT Pub. Date: Jul. 18, 2019

(65) Prior Publication Data
US 2021/0080250 A1 Mar. 18, 2021

(30) Foreign Application Priority Data
Jan. 9, 2018 (JP) .............................. JP2018-001306

(51) Int. Cl.
*G01B 11/06* (2006.01)
*G01N 21/45* (2006.01)

(52) U.S. Cl.
CPC ...... *G01B 11/0625* (2013.01); *G01B 11/0658* (2013.01); *G01N 21/45* (2013.01)

(58) Field of Classification Search
CPC . G01B 11/0625; G01B 11/06; G01B 11/0633; G01B 11/0675; G01B 11/0641;
(Continued)

(56) References Cited

U.S. PATENT DOCUMENTS 3,751,643 A 8/1973 Dill et al.
5,486,701 A 1/1996 Norton et al.
(Continued)

FOREIGN PATENT DOCUMENTS

CN 1140832 A 1/1997
CN 101363768 A 2/2009
(Continued)

OTHER PUBLICATIONS

International Preliminary Report on Patentability dated Jul. 23, 2020 for PCT/JP2018/036697.

*Primary Examiner* — Michael P Stafira
(74) *Attorney, Agent, or Firm* — Faegre Drinker Biddle & Reath LLP

(57) ABSTRACT

A film thickness measurement device includes a light output unit that outputs measurement light, a spectroscopic detection unit that detects detection light, and an analysis unit that compares a measured reflectance for each wavelength of a measurement object with a theoretical reflectance and analyzes a film thickness of a first film and a film thickness of a second film. The analysis unit acquire candidates for optimal solutions of the film thicknesses using a result of comparison between the measured reflectance and the theoretical reflectance for each wavelength of the measurement object in a first wavelength range and determines the optimal solutions of the film thicknesses out of the candidates for the optimal solutions using a result of comparison between the
(Continued)

measured reflectance and the theoretical reflectance for each wavelength of the measurement object in a second wavelength range.

17 Claims, 12 Drawing Sheets

(58) Field of Classification Search
CPC ............ G01B 11/0683; G01B 11/0658; G01B 11/303; G01B 11/0691; G01B 2210/56; G01B 11/168; G01B 11/0616; G01B 11/25; G01B 11/30; G01B 9/02041; G01B 11/02; G01B 11/022; G01B 11/0608; G01B 11/24; G01B 11/2441; G01B 21/042; G01B 2210/48; G01B 9/02; G01B 9/02015; G01B 9/02024; G01B 9/02043; G01B 9/02062; G01B 9/0209; G01B 15/02; G01B 21/08; G01B 9/02044; G01N 21/211; G01N 21/8422; G01N 21/55; G01N 21/9501; G01N 21/45; G01N 21/41; G01N 21/94; G01N 21/27; G01N 2021/213; G01N 21/896; G01N 21/17; G01N 21/88; G01N 2021/6432; G01N 21/6428; G01N 2201/068; G01N 2333/95; G01N 33/551; G01N 33/552; G01N 33/553; G01N 33/573; G01N 2033/0095; G01N 21/31; G01N 21/59; G01N 2021/8838; G01N 21/21; G01N 21/84; G01N 21/8806; G01N 21/956; G01N 2201/061; G01N 2201/0696; G01N 2021/218; G01N 2021/458; G01N 21/00; G01N 21/25; G01N 21/33; G01N 21/35; G01N 21/453; G01N 21/47; G01N 21/4738; G01N 21/474; G01N 21/552; G01N 21/78; G01N 21/783; G01N 2201/06113; G01N 2201/064; G01N 2201/128; G01N 2021/1738; G01N 21/274; G01N 21/3554; G01N 21/359; G01N 21/553; G01N 2223/052; G01N 2223/054; G01N 2223/1016; G01N 23/20; G01N 23/20008; G01N 23/201
See application file for complete search history.

(56) References Cited

U.S. PATENT DOCUMENTS

| | | | |
|---|---|---|---|
| 6,204,922 B1 | 3/2001 | Chalmers | |
| 2011/0205540 A1* | 8/2011 | Moll | ............ G01B 11/0675 356/369 |
| 2016/0018334 A1* | 1/2016 | Tomar | ............ G01K 13/00 356/301 |
| 2017/0030707 A1 | 2/2017 | Srocka | |

FOREIGN PATENT DOCUMENTS

| | | | | | |
|---|---|---|---|---|---|
| CN | 102341670 | A | | 2/2012 | |
| CN | 102914268 | A | | 2/2013 | |
| CN | 103579037 | A | * | 2/2014 | |
| CN | 105606566 | A | | 5/2016 | |
| CN | 105870010 | A | * | 8/2016 | ....... H01L 29/66522 |
| CN | 106595501 | A | | 4/2017 | |
| CN | 107504907 | A | | 12/2017 | |
| CN | 107641800 | A | * | 1/2018 | |
| JP | H2-179402 | A | | 7/1990 | |
| JP | H07-091921 | A | | 4/1995 | |
| JP | H11-160028 | A | | 6/1999 | |
| JP | 2000-046525 | A | | 2/2000 | |
| JP | 2000309864 | A | * | 11/2000 | |
| JP | 2005-140726 | A | | 6/2005 | |
| JP | 2010-002327 | A | | 1/2010 | |
| JP | 4871435 | B1 | * | 2/2012 | ......... G01B 11/0625 |
| JP | 2014-055780 | A | | 3/2014 | |
| JP | 2014055780 | A | * | 3/2014 | |
| JP | 6285597 | B1 | * | 2/2018 | ......... G01B 9/02024 |
| KR | 20090132537 | A | * | 12/2009 | |
| KR | 20160150004 | A | | 12/2016 | |
| KR | 101894828 | B1 | * | 9/2018 | ............ H01L 43/08 |
| TW | 200424497 | A | | 11/2004 | |
| TW | 1278597 | B | | 4/2007 | |
| TW | 201337206 | A | | 9/2013 | |
| WO | WO-2013099107 | A1 | * | 7/2013 | ............ H01L 22/12 |

\* cited by examiner

FILM THICKNESS MEASUREMENT DEVICE, FILM THICKNESS MEASUREMENT METHOD, FILM THICKNESS MEASUREMENT PROGRAM, AND RECORDING MEDIUM FOR RECORDING FILM THICKNESS MEASUREMENT PROGRAM

TECHNICAL FIELD

The present disclosure relates to a film thickness measurement device, a film thickness measurement method, a film thickness measurement program, and a recording medium having the film thickness measurement program recorded thereon.

BACKGROUND ART

Recently, a 3D-NAND memory has attracted attention as a device that can realize a storage with a higher density than a two-dimensional memory in the related art. A 3D-NAND memory has a configuration in which layers of a data storage cell are vertically stacked. Each data storage cell has a multi-layered film structure in which a silicon oxide film and a silicon nitride film are repeatedly stacked on a silicon substrate, and one pair of a silicon oxide film and a silicon nitride film forms one data storage cell. Since the memory capacity of the device is proportional to the number of pairs of the silicon oxide film and the silicon nitride film, an increase in the number of layers and a decrease in film thickness of a device have progressed. Nonuniformity in film thickness affects electrical characteristics of a device and nonuniformity in film formation rate causes a decrease in productivity due to an increase in the number of cleanings. Accordingly, the importance of quality control of film thicknesses and process control in film formation at the time of manufacturing a device has increased.

In view of more accurate execution of process control, it is preferable that thicknesses of films which are formed be separately measured. Cross-sectional observation technology such as a scanning electron microscope (SEM) or a transmission electron microscope (TEM) is known as film thickness measurement technology. However, such technology has many constraints on embodiments and can be said to be unsuitable for application to an in-line film thickness monitor for the purpose of process control.

When application to an in-line film thickness monitor is considered, a method using spectroscopy (a spectroscopy method) can be employed. When a spectroscopy method is used, assembly of a measurement head into film formation equipment is simple and there are few constraints on embodiments. Accordingly, a spectroscopy method can be easily applied to an in-line film thickness monitor in comparison with the cross-sectional observation technology. An example of a film thickness measurement method using spectroscopy is a thin film measurement method described in Patent Literature 1. In the thin film measurement method according to the related art, a measured reflectance and a theoretical reflectance for each wavelength in a measurement object are compared and thicknesses of films are analyzed using a curve fitting method.

CITATION LIST

Patent Literature

[Patent Literature 1] Japanese Unexamined Patent Publication No. 2005-140726

SUMMARY OF INVENTION

Technical Problem

In analysis of film thicknesses using curve fitting, an optimal solution in which a fitting residual between a measured reflectance and a theoretical reflectance has a minimum value is searched for while changing analysis parameters (for example, film thicknesses). However, a solution of a fitting residual may include a solution which is a minimum value (hereinafter referred to as a localized solution) in addition to an optimal solution. There are more likely to be localized solutions as the number of analysis parameters or a search range is enlarged. Accordingly, when film thickness analysis using curve fitting is simply applied to a measurement object having a multi-layered film structure, the number of comparison operations between a measured reflectance and a theoretical reflectance may increase or it may be difficult to search for an optimal solution due to an increase in the number of localized solutions.

The present disclosure is made to solve the above-mentioned problems and an objective thereof is to provide a film thickness measurement device, a film thickness measurement method, a film thickness measurement program, and a recording medium having the film thickness measurement program recorded thereon that can rapidly and accurately perform measurement of film thicknesses in line on a measurement object with a multi-layered film structure.

Solution to Problem

A film thickness measurement device according to an aspect of the present disclosure is a film thickness measurement device that measures a film thickness of a first film and a film thickness of a second film in a measurement object in which the first film and the second film are repeatedly alternately stacked on a substrate, the film thickness measurement device including: a light output unit configured to output measurement light to the measurement object; a spectroscopic detection unit configured to spectroscopically detect detection light from the measurement object; and an analysis unit configured to compare a measured reflectance for each wavelength of the measurement object which is acquired from a result of detection by the spectroscopic detection unit with a theoretical reflectance and to analyze the film thickness of the first film and the film thickness of the second film, wherein the analysis unit is configured to acquire candidates for optimal solutions of the film thickness of the first film and the film thickness of the second film using a result of comparison between the measured reflectance and the theoretical reflectance for each wavelength of the measurement object in a first wavelength range, and to determine the optimal solutions of the film thickness of the first film and the film thickness of the second film out of the candidates for the optimal solutions using a result of comparison between the measured reflectance and the theoretical reflectance for each wavelength of the measurement object in a second wavelength range which is different from the first wavelength range.

In this film thickness measurement device, the optimal solutions of the film thickness of the first film and the film thickness of the second film are determined out of the candidates for the optimal solutions by comparing the measured reflectance and the theoretical reflectance using two different wavelength ranges. When the sums of the film thicknesses of the first film and the second film are the same but the film thickness of the first film and the film thickness of the second film are different, there may be a difference between the theoretical reflectance in the first wavelength range and the theoretical reflectance in the second wavelength range. Accordingly, it is possible to rapidly and accurately perform measurement of film thicknesses on a measurement object with a multi-layered film structure by acquiring the candidates for the optimal solutions using the first wavelength range and determining the optimal solutions out of the candidates for the optimal solutions using the second wavelength range. Since spectroscopy is used in the film thickness measurement device, there are few constraints on embodiments and the film thickness measurement device can be more easily applied to an in-line film thickness monitor in comparison with the cross-sectional observation technology.

The comparison between the measured reflectance and the theoretical reflectance in the analysis unit may be performed on the basis of a super-lattice model in which it is assumed that the film thickness of the first film and the film thickness of the second film are constant in respective layers. By using the super-lattice model, it is possible to greatly decrease the number of analysis parameters which are used to determine the candidates for the optimal solutions and the optimal solutions and to decrease an analysis load. The problem in which there are many localized solutions even when the super-lattice model is used can be resolved through comparison between the measured reflectance and the theoretical reflectance using the two different wavelength ranges.

The second wavelength range which is used in the analysis unit may include a wavelength range of shorter wavelengths than those of the first wavelength range. A difference between the theoretical reflectance in the first wavelength range and the theoretical reflectance in the second wavelength range is likely to appear at a shorter wavelength. Accordingly, by causing the second wavelength range to include a wavelength range of shorter wavelengths than those of the first wavelength range, it is possible to more reliably determine the optimal solutions out of the candidates for the optimal solutions.

The second wavelength range which is used in the analysis unit may include an ultraviolet range. A difference between the theoretical reflectance in the first wavelength range and the theoretical reflectance in the second wavelength range is likely to appear in the ultraviolet range. Accordingly, by causing the second wavelength range to include the ultraviolet range, it is possible to more reliably determine the optimal solutions out of the candidates for the optimal solutions.

The second wavelength range which is used in the analysis unit may include a range of 200 nm to 300 nm. A difference between the theoretical reflectance in the first wavelength range and the theoretical reflectance in the second wavelength range is likely to appear in the range of 200 nm to 300 nm. Accordingly, by causing the second wavelength range to include the range of 200 nm to 300 nm, it is possible to more reliably determine the optimal solutions out of the candidates for the optimal solutions.

The first wavelength range which is used in the analysis unit may include a range of 300 nm to 800 nm. By causing the first wavelength range to include the range of 300 nm to 800 nm, it is possible to more reliably cause the difference between the theoretical reflectance in the first wavelength range and the theoretical reflectance in the second wavelength range to appear. Accordingly, by causing the first wavelength range to include the range of 300 nm to 800 nm, it is possible to more reliably determine the optimal solutions out of the candidates for the optimal solutions.

Transmitted light of the measurement light which is transmitted by the measurement object or reflected light of the measurement light which is reflected by the measurement object may be used as the detection light. In this case, it is possible to appropriately spectroscopically divide the detection light.

The first film may be a silicon oxide film and the second film may be a silicon nitride film. In this case, it is possible to appropriately realize an in-line film thickness monitor for a device with a multi-layered film structure such as a 3D-NAND memory.

A film thickness measurement method according to an aspect of the present disclosure is a film thickness measurement method of measuring a film thickness of a first film and a film thickness of a second film in a measurement object in which the first film and the second film are repeatedly alternately stacked on a substrate, the film thickness measurement method including: a light output step of outputting measurement light to the measurement object; a spectroscopic detection step of spectroscopically detecting detection light from the measurement object; and an analysis step of comparing a measured reflectance for each wavelength of the measurement object which is acquired from a result of spectroscopic detection with a theoretical reflectance and analyzing the film thickness of the first film and the film thickness of the second film, wherein the analysis step includes a candidate determining step of acquiring candidates for optimal solutions of the film thickness of the first film and the film thickness of the second film using a result of comparison between the measured reflectance and the theoretical reflectance for each wavelength of the measurement object in a first wavelength range and an optimal solution determining step of determining the optimal solutions of the film thickness of the first film and the film thickness of the second film out of the candidates for the optimal solutions using a result of comparison between the measured reflectance and the theoretical reflectance for each wavelength of the measurement object in a second wavelength range which is different from the first wavelength range.

In this film thickness measurement method, the optimal solutions of the film thickness of the first film and the film thickness of the second film are determined out of the candidates for the optimal solutions by comparing the measured reflectance and the theoretical reflectance using two different wavelength ranges. When the sums of the film thicknesses of the first film and the second film are the same but the film thickness of the first film and the film thickness of the second film are different, there may be a difference between the theoretical reflectance in the first wavelength range and the theoretical reflectance in the second wavelength range. Accordingly, it is possible to rapidly and accurately perform measurement of film thicknesses on a measurement object with a multi-layered film structure by acquiring the candidates for the optimal solutions using the first wavelength range and determining the optimal solutions out of the candidates for the optimal solutions using the second wavelength range. Since spectroscopy is used in the film thickness measurement method, there are few constraints on embodiments and the film thickness measurement method can be more easily applied to an in-line film thickness monitor in comparison with the cross-sectional observation technology.

The comparison between the measured reflectance and the theoretical reflectance in the analysis step may be performed on the basis of a super-lattice model in which it is assumed that the film thickness of the first film and the film thickness of the second film are constant in respective layers. By using the super-lattice model, it is possible to greatly decrease the number of analysis parameters which are used to determine the candidates for the optimal solutions and the optimal solutions and to decrease an analysis load. The problem in which there are many localized solutions even when the super-lattice model is used can be resolved through comparison between the measured reflectance and the theoretical reflectance using the two different wavelength ranges.

The second wavelength range which is used in the analysis step may include a wavelength range of shorter wavelengths than those of the first wavelength range. A difference between the theoretical reflectance in the first wavelength range and the theoretical reflectance in the second wavelength range is likely to appear at a shorter wavelength. Accordingly, by causing the second wavelength range to include a wavelength range of shorter wavelengths than those of the first wavelength range, it is possible to more reliably determine the optimal solutions out of the candidates for the optimal solutions.

The second wavelength range which is used in the analysis step may include an ultraviolet range. The difference between the theoretical reflectance in the first wavelength range and the theoretical reflectance in the second wavelength range is likely to appear in the ultraviolet range. Accordingly, by causing the second wavelength range to include the ultraviolet range, it is possible to more reliably determine the optimal solutions out of the candidates for the optimal solutions.

The second wavelength range which is used in the analysis step may include a range of 200 nm to 300 nm. The difference between the theoretical reflectance in the first wavelength range and the theoretical reflectance in the second wavelength range is likely to appear in the range of 200 nm to 300 nm. Accordingly, by causing the second wavelength range to include the range of 200 nm to 300 nm, it is possible to more reliably determine the optimal solutions out of the candidates for the optimal solutions.

The first wavelength range which is used in the analysis step may include a range of 300 nm to 800 nm. By causing the first wavelength range to include the range of 300 nm to 800 nm, it is possible to more reliably cause the difference between the theoretical reflectance in the first wavelength range and the theoretical reflectance in the second wavelength range to appear. Accordingly, by causing the first wavelength range to include the range of 300 nm to 800 nm, it is possible to more reliably determine the optimal solutions out of the candidates for the optimal solutions.

Transmitted light of the measurement light which is transmitted by the measurement object or reflected light of the measurement light which is reflected by the measurement object may be used as the detection light. In this case, it is possible to appropriately spectroscopically divide the detection light.

The first film may be a silicon oxide film and the second film may be a silicon nitride film. In this case, it is possible to appropriately realize an in-line film thickness monitor for a device with a multi-layered film structure such as a 3D-NAND memory.

A film thickness measurement program according to an aspect of the present disclosure is a film thickness measurement program that measures a film thickness of a first film and a film thickness of a second film in a measurement object in which the first film and the second film are repeatedly alternately stacked on a substrate, the film thickness measurement program causing a computer to serve as an analysis unit configured to compare a measured reflectance for each wavelength of the measurement object which is acquired from a result of detection by a spectroscopic detection unit with a theoretical reflectance and to analyze the film thickness of the first film and the film thickness of the second film, wherein the analysis unit is caused to perform: a process of acquiring candidates for optimal solutions of the film thickness of the first film and the film thickness of the second film using a result of comparison between the measured reflectance and the theoretical reflectance for each wavelength of the measurement object in a first wavelength range; and a process of determining the optimal solutions of the film thickness of the first film and the film thickness of the second film out of the candidates for the optimal solutions using a result of comparison between the measured reflectance and the theoretical reflectance for each wavelength of the measurement object in a second wavelength range which is different from the first wavelength range.

A recording medium having a film thickness measurement program recorded thereon according to an aspect of the present disclosure is a computer-readable recording medium having the above-mentioned film thickness measurement program recorded thereon.

In a computer to which the film thickness measurement program and the recording medium are applied, the optimal solutions of the film thickness of the first film and the film thickness of the second film are determined out of the candidates for the optimal solutions by comparing the measured reflectance and the theoretical reflectance using two different wavelength ranges. When the sums of the film thicknesses of the first film and the second film are the same but the film thickness of the first film and the film thickness of the second film are different, there may be a difference between the theoretical reflectance in the first wavelength range and the theoretical reflectance in the second wavelength range. Accordingly, it is possible to rapidly and accurately perform measurement of film thicknesses on a measurement object with a multi-layered film structure by acquiring the candidates for the optimal solutions using the first wavelength range and determining the optimal solutions out of the candidates for the optimal solutions using the second wavelength range. Since spectroscopy is used in the film thickness measurement program, there are few constraints on embodiments and the film thickness measurement program can be more easily applied to an in-line film thickness monitor in comparison with the cross-sectional observation technology.

Advantageous Effects of Invention

According to the present disclosure, it is possible to rapidly and accurately perform measurement of film thicknesses in line on a measurement object with a multi-layered film structure.

DESCRIPTION OF EMBODIMENTS

Hereinafter, exemplary embodiments of a film thickness measurement device and a film thickness measurement method according to an aspect of the present disclosure will be described in detail with reference to the accompanying drawings.

[Configuration of Film Thickness Measurement Device]

Figure 1:
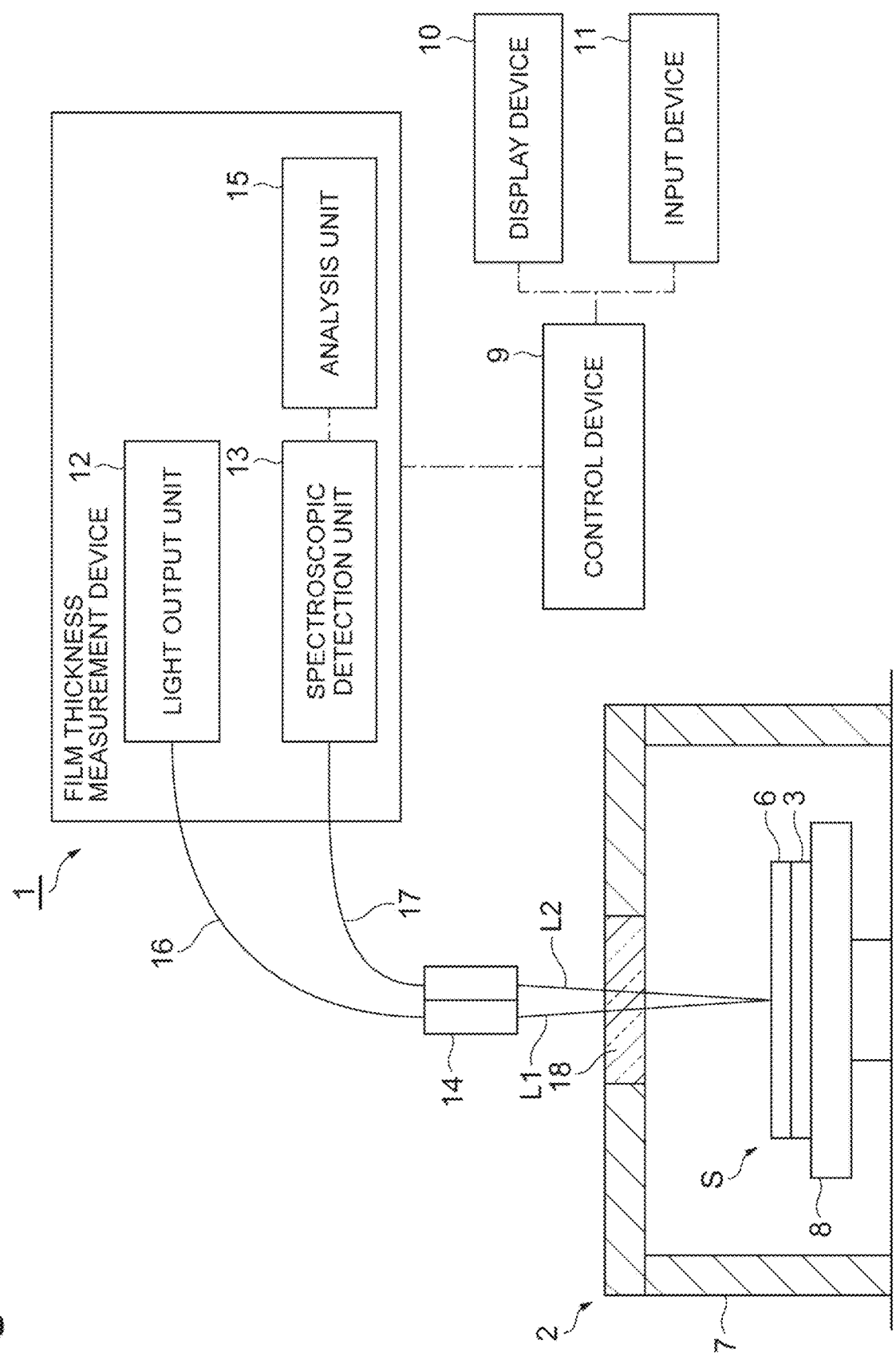
FIG. 1 is a diagram schematically illustrating a configuration of an embodiment of a film thickness measurement device.

FIG. 1 is a diagram schematically illustrating a configuration of an embodiment of a film thickness measurement device. The film thickness measurement device 1 is a device that measures thicknesses of films constituting a measurement object S. In this embodiment, the film thickness measurement device 1 is configured as an in-line film thickness monitor in film formation equipment 2. A measurement object S is, for example, a device having a multi-layered film structure 6 in which a first film 4 and a second film 5 (see FIG. 3) are repeatedly alternately stacked on a substrate 3. The measurement object S is disposed on a stage 8 which is provided in a chamber 7 of the film formation equipment 2.

As illustrated in FIG. 1, a control device 9 is connected to the film thickness measurement device 1. The control device 9 is a device that controls operation of the film thickness measurement device 1 and is constituted, for example, by a computer. The computer includes, for example, a memory such as a RAM and a ROM, a processor (an arithmetic operation circuit) such as a CPU, a communication interface, and a storage unit such as a hard disk. Examples of such a computer include a personal computer, a microcomputer, a cloud server, and a smart device (such as a smartphone or a tablet terminal).

A display device 10 such as a monitor and an input device 11 such as a keyboard and a mouse are connected to the control device 9. For example, film thicknesses which are measured by the film thickness measurement device 1 and set measurement conditions are displayed on the display device 10. The input device 11 performs various types of inputs such as an input of measurement start and an input of measurement conditions on the control device 9 on the basis of a user's operation. The control device 9, the display device 10, and the input device 11 may be incorporated into elements of the film thickness measurement device 1.

As illustrated in FIG. 1, the film thickness measurement device 1 includes a light output unit 12, a spectroscopic detection unit 13, a measurement head 14, and an analysis unit 15. The light output unit 12 outputs measurement light L1 to a measurement object S. The light output unit 12 is constituted, for example, by a light source device that outputs white light including wavelengths in an ultraviolet range. Examples of such a light source device include a xenon lamp and a lamp in which a deuterium lamp and a halogen lamp are combined.

The spectroscopic detection unit 13 detects detection light L2 from the measurement object S. The spectroscopic detection unit 13 is a so-called multi-channel spectroscopic detector. For example, the spectroscopic detection unit 13 spectroscopically divides the detection light L2 to wavelength components using a spectroscopic element such as a grating or a prism and detects light intensities of the divided wavelengths using an optical sensor group. The optical sensor group is constituted, for example, by arranging a plurality of light receiving elements in one dimension. The optical sensor group detects light intensities of the wavelength components in the detection light L2 using the light receiving elements corresponding to the wavelengths and outputs a result of detection to the analysis unit 15.

The measurement head 14 performs application of measurement light L1 and reception of detection light L2 on the measurement object S which is disposed in the chamber 7 of the film formation equipment 2. The measurement head 14 is optically connected to the light output unit 12 and the spectroscopic detection unit 13 via light guide members 16 and 17 such as optical fibers and is disposed in the vicinity of a view port 18 which is provided in the chamber 7 of the film formation equipment 2. The measurement light L1 from the light output unit 12 is guided by the light guide member 16 and is incident on the measurement object S from the measurement head 14 via the view port 18. The detection light L2 from the measurement object S is incident on the measurement head 14 via the view port 18. The detection light L2 incident on the measurement head 14 is guided by the light guide member 17 and is incident on the spectroscopic detection unit 13. In the example illustrated in FIG. 1, reflected light of the measurement light L1 which is reflected by the measurement object S is used as the detection light L2, but the detection light L2 may be transmitted light of the measurement light L1 which is transmitted by the measurement object S.

The analysis unit 15 analyzes film thicknesses of films constituting the measurement object S. For example, the analysis unit 15 may be constituted by a computer similarly to the control device 9 or may be constituted by an integrated circuit such as a field-programmable gate array (FPGA). When a result of detection of light intensities of the wavelength components of the detection light L2 is received from the spectroscopic detection unit 13, the analysis unit 15 compares a measured reflectance for each wavelength of the measurement object S with a theoretical reflectance on the basis of the result of detection and analyzes the film thickness of a first film 4 and the film thickness of a second film 5.

More specifically, the analysis unit 15 acquires candidates for optimal solutions of the film thickness of the first film 4 and the film thickness of the second film 5 using the result of comparison between the measured reflectance and the theoretical reflectance for each wavelength of the measurement object S in a first wavelength range. The analysis unit 15 determines the optimal solutions of the film thickness of the first film 4 and the film thickness of the second film 5 out of the candidates for the optimal solutions using the result of comparison between the measured reflectance and the theoretical reflectance for each wavelength of the measurement object S in a second wavelength range which is different from the first wavelength range.

[Principle of Analysis of Film Thickness in Analysis Unit]

When white light is incident on the multi-layered film structure 6 formed on the substrate 3 of the measurement object S, interference light is generated by light which is reflected by the surface of the substrate 3 and light reflected by the surface of a film. A wavelength distribution of reflectance which is calculated on the basis of the intensity of the interference light is a distribution based on a film thickness. As the film thickness increases, the number of tops and bottoms in the wavelength distribution of reflectance increases and a gap between tops and bottoms at a shorter wavelength tends to be less than a gap between tops and bottoms at a longer wavelength.

The analysis unit 15 analyzes the film thickness of the first film 4 and the film thickness of the second film 5 by curve fitting using this trend. That is, the analysis unit 15 calculates the film thickness of the first film 4 and the film thickness of the second film 5 in the measurement object S on the basis of a degree of fitting between the wavelength distribution of reflectance (a measured reflectance) which is actually measured and a theoretical reflectance (theoretical reflectance) when the film thickness has a predetermined value. In the curve fitting, the film thickness of the first film 4 and the film thickness of the second film 5 vary as analysis parameters, film thicknesses in which a fitting residual (for example, a square sum of differences between the measured reflectance and the theoretical reflectance) is the smallest are searched for, and the searched film thicknesses are determined as the film thickness of the first film 4 and the film thickness of the second film 5.

Figure 2:
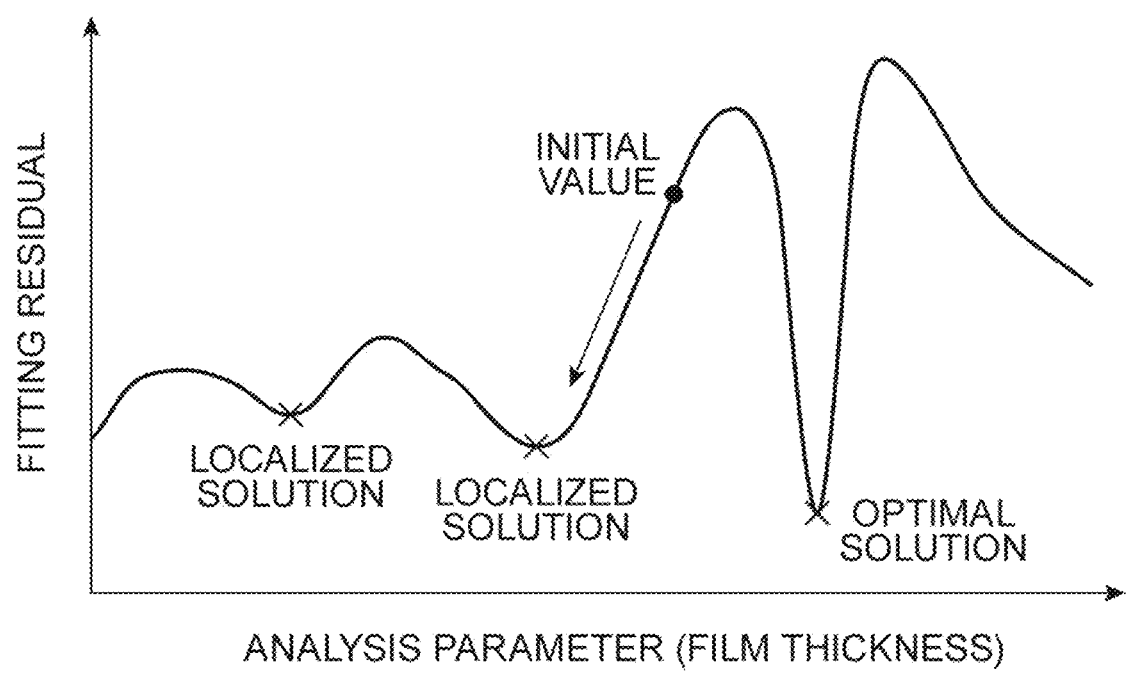
FIG. 2 is a diagram illustrating a problem in curve fitting.

Curve fitting is a technique which is known in the related art, and there may be a solution in which a fitting residual is a minimum value (hereinafter referred to as a localized solution) in addition to the optimal solutions which are to be calculated as illustrated in FIG. 2. The possibility that there will be a plurality of localized solutions increases as the number of analysis parameters or a search range is enlarged. Depending on analysis conditions such as setting of an initial value, there may be concern that a localized solution will be searched for and optimal solutions will not be able to be correctly searched for. Accordingly, when film thickness analysis using curve fitting is simply applied to a measurement object S with a multi-layered film structure 6, there may be a problem in that the number of comparison operations between the measured reflectance and the theoretical reflectance increases greatly or it is difficult to search for optimal solutions due to an increase in the number of localized solutions.

In this embodiment, when the film thickness of the first film 4 and the film thickness of the second film 5 in the measurement object S are analyzed, comparison between the measured reflectance and the theoretical reflectance in the analysis unit 15 is performed on the basis of a super-lattice model in which it is assumed that the film thickness of the first film 4 and the film thickness of the second film 5 are the same in each layer. The measurement object S illustrated in FIG. 3 has a multi-layered film structure in which a total of 65 layers including a first film 4 which is a diffusing layer and 32 pairs (64 layers) of the first film 4 and the second film 5 are stacked on the substrate 3. An example of such a measurement object S is a 3D-NAND memory. In this case, for example, the substrate 3 is a silicon substrate, the first film 4 is a silicon oxide film ($SiO_x$), and the second film 5 is a silicon nitride film ($SiN_x$).

In normal curve fitting for such a measurement object S, 65 analysis parameters are used. However, when a super-lattice model is used, it is assumed that the film thicknesses of the layers of the first film 4 are the same and the film thicknesses of the layers of the second film 5 are the same, and thus the number of analysis parameters is only two regardless of the number of pairs of the first film 4 and the second film 5. In this case, the film thickness of the first film 4 is a first analysis parameter and the film thickness of the second film 5 is a second analysis parameter.

Figure 3:
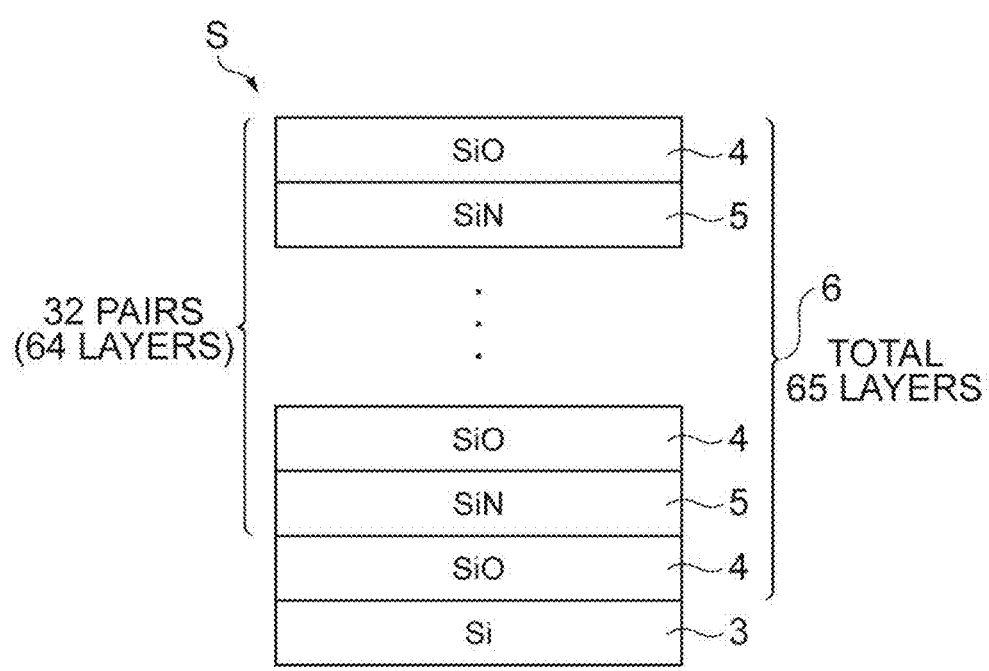
FIG. 3 is a diagram schematically illustrating a layer configuration of a measurement object.
Figure 4:
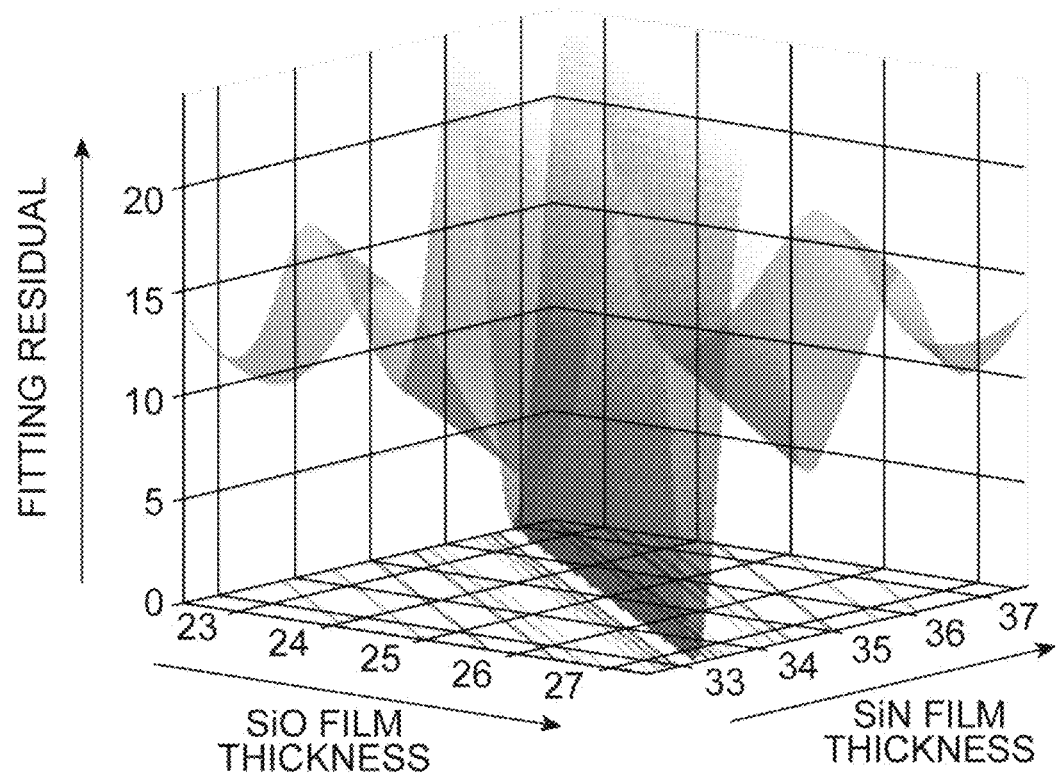
FIG. 4 is a diagram illustrating an example of a result of comparison between a measured reflectance and a theoretical reflectance in a measurement object.
Figure 5:
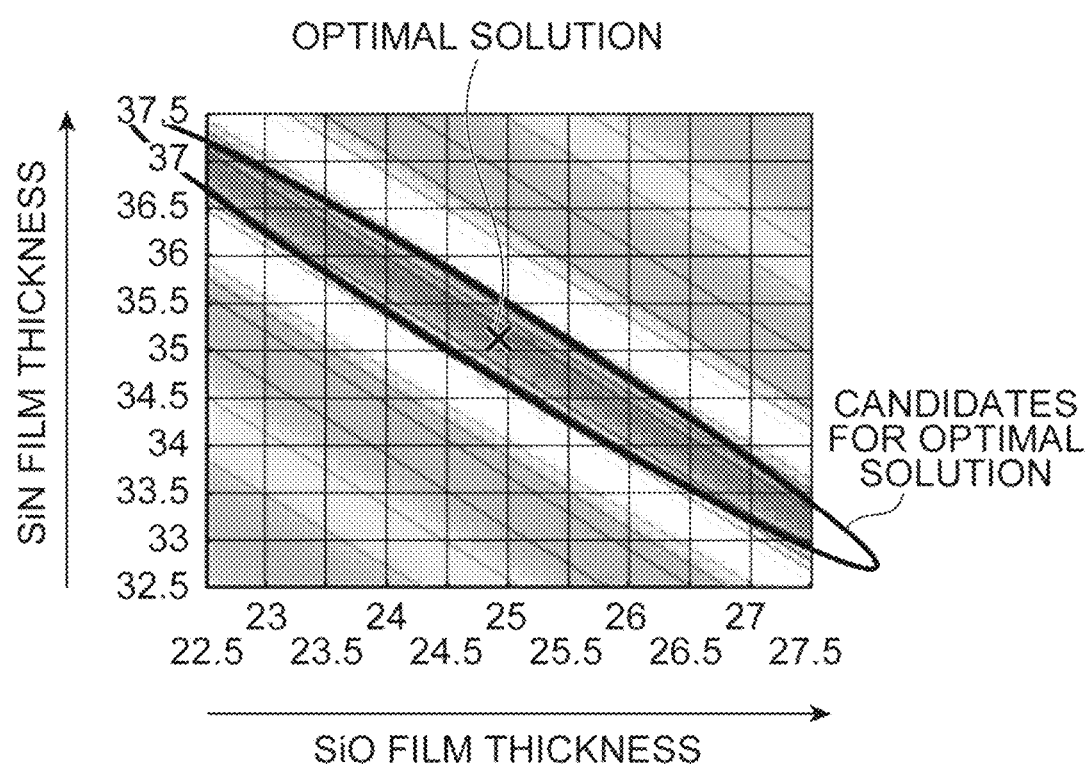
FIG. 5 is a diagram illustrating an XY plane in FIG. 4.
Figure 6:
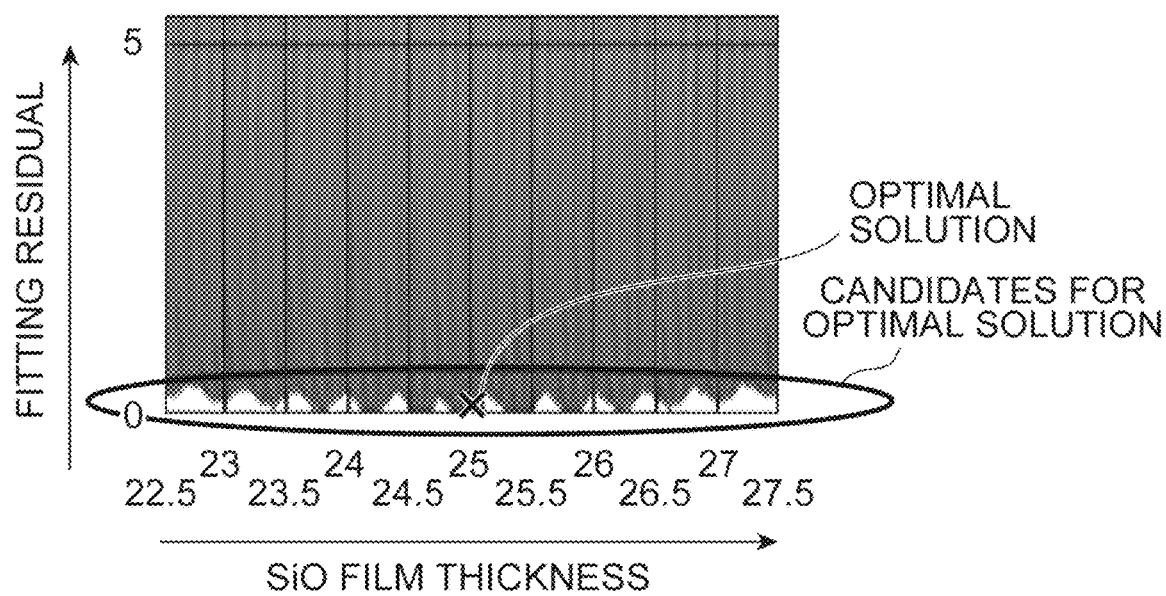
FIG. 6 is a diagram illustrating an XZ plane in FIG. 4.

FIG. 4 is a diagram illustrating an example of a result of comparison between a measured reflectance and a theoretical reflectance in the measurement object S illustrated in FIG. 3. In the drawing, the X axis is set to an SiO film thickness (the film thickness of the first film 4), the Y axis is set to an SiN film thickness (the film thickness of the second film 5), and the Z axis is set to a fitting residual between the measured reflectance and the theoretical reflectance (a residual map). FIG. 5 illustrates the XY plane in FIG. 4 and FIG. 6 illustrates the XZ plane in FIG. 4. From these results, it can be understood that there are a plurality of localized solutions for the film thickness of the first film 4 and the film thickness of the second film 5 even when the super-lattice model is used. From the results illustrated in FIG. 5, it can be understood that the fitting residual in all combinations in which the sums of the film thicknesses (optical thicknesses) of the first film 4 and the second film 5 are the same is less than those in other combinations. From the results illustrated in FIG. 6, it can be understood that there are periodically a plurality of localized solutions in all the combinations in which the sums of the film thicknesses (optical thicknesses) of the first film 4 and the second film 5 are the same and a numerical difference in the fitting residual between the localized solutions and the optimal solutions is small.

Figure 7:
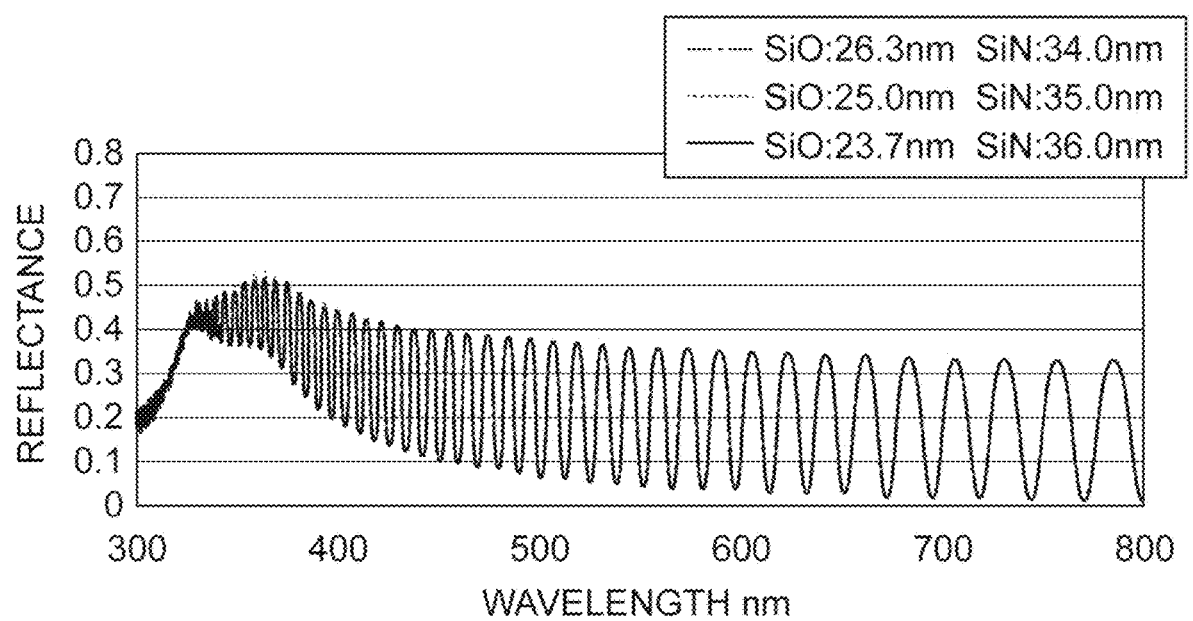
FIG. 7 is a diagram illustrating a theoretical reflectance in a first wavelength range in combinations in which the sums of film thicknesses of a first film and a second film are the same.

FIG. 7 is a diagram illustrating a theoretical reflectance in the first wavelength range in the combinations in which the sums of the film thicknesses (optical thicknesses) of the first film 4 and the second film 5 are the same. In the drawing, the horizontal axis represents wavelength and the vertical axis represents reflectance. The first wavelength range is exemplified as a range of 300 nm to 800 nm. As the combinations in which the sums of the film thicknesses (optical thicknesses) of the first film 4 and the second film 5 are the same, three combinations of 1) SiO: 26.3 nm/SiN: 34.0 nm, 2) SiO: 25.0 nm/SiN: 35.0 nm, and 3) SiO: 23.7 nm/SiN: 36.0 nm are illustrated. The optical thicknesses obtained by multiplying such thicknesses by refractive indices of the films are the same. From the results illustrated in FIG. 7, it can be understood that there is almost no difference in theoretical reflectance in the first wavelength range in the combinations in which the sums of the film thicknesses (optical thicknesses) of the first film 4 and the second film 5 are the same.

Figure 8:
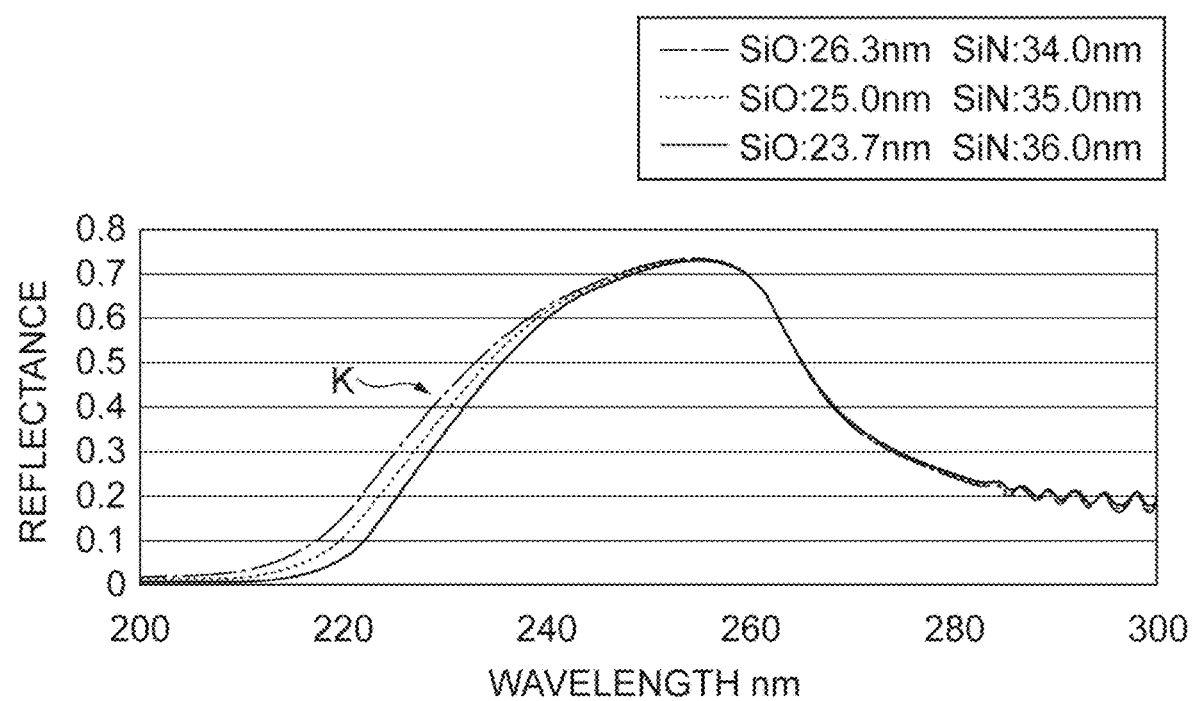
FIG. 8 is a diagram illustrating a theoretical reflectance in a second wavelength range in combinations in which the sums of film thicknesses of the first film and the second film are the same.

FIG. 8 is a diagram illustrating a theoretical reflectance in the second wavelength range in the combinations in which the sums of the film thicknesses (optical thicknesses) of the first film 4 and the second film 5 are the same. In the drawing, the horizontal axis represents wavelength and the vertical axis represents reflectance. The second wavelength range includes a wavelength range of shorter wavelengths than those of the first wavelength range and includes an ultraviolet range. The second wavelength range is exemplified as a range of 200 nm to 300 nm. The combinations in which the sums of the film thicknesses (optical thicknesses) of the first film 4 and the second film 5 are the same as illustrated in FIG. 7. In the example illustrated in FIG. 8, even when the sums of the film thicknesses (optical thicknesses) of the first film 4 and the second film 5 are the same, it can be understood that a rising part K of the reflectance appearing in the vicinity of 220 nm is shifted to a longer wavelength as the film thickness of the first film 4 decreases (as the film thickness of the second film 5 increases). Accordingly, by causing the analysis unit 15 to compare the measured reflectance with the theoretical reflectance using this feature, it is possible to resolve the problem that it is difficult to search the optimal solutions due to an increase in the number of localized solutions.

[Operation of Film Thickness Measurement Device]

On the basis of the above principles, the film thickness measurement device 1 performs a light output step, a spectroscopic detection step, and an analysis step. In the light output step, measurement light L1 is output to a measurement object S. In the light output step, white light which is output from the light output unit 12 is guided by the light guide member 16, exits from the measurement head 14, and is incident on the measurement object S in the chamber 7 of the film formation equipment 2 via the view port 18. In the spectroscopic detection step, spectroscopic detection of detection light L2 from the measurement object S is performed. In the spectroscopic detection step, the detection light L2 from the measurement object S is incident on the measurement head 14 via the view port 18, is guided by the light guide member 17, and is incident on the spectroscopic detection unit 13.

In the analysis step, the measured reflectance for each wavelength of the measurement object S which is acquired from the result of spectroscopic detection is compared with the theoretical reflectance, and the film thickness of the first film 4 and the film thickness of the second film 5 are analyzed. When a reflection spectrum of the measurement object S acquired by spectroscopic detection is defined as $R_{SIG}$, a reflection spectrum of a standard measurement object with a known reflectance is defined as $R_{REF}$, and the reflectance of the standard measurement object is defined as $R_{STD}$, the measured reflectance R is calculated by an expression of $R=R_{SIG} \times R_{STD}/R_{REF}$. The theoretical reflectance is calculated using Fresnel's principle on the basis of an optical constant (a refractive index or an extinction coefficient) of the substrate 3, the thickness of the substrate 3, and the optical constants, the film thicknesses, and the number of pairs of the first film 4 and the second film 5.

In the analysis step, a candidate determining step and an optical solution determining step are sequentially performed. In the candidate determining step, candidates for the optimal solutions of the film thickness of the first film 4 and the film thickness of the second film 5 are acquired using the result of comparison between the measured reflectance and the theoretical reflectance for each wavelength of the measurement object S in the first wavelength range. The first wavelength range can be set from a range in which the theoretical reflectance is approximate and tops and bottoms of a reflection profile are sufficiently included in the combinations in which the sums of the film thicknesses (optical thicknesses) of the first film 4 and the second film 5 are the same. Referring to FIG. 7, the first wavelength range may include a range of 300 nm to 800 nm or may include a range of 400 nm to 800 nm.

In the candidate determining step, for example, a search range for the film thickness of the first film 4 is set as a reference search range and candidates for the optimal solution of the film thickness of the first film 4 in the reference search range are defined as $D_o[i]$ (where i=1, 2, . . . n). Only the film thickness of the second film 5 is set as the analysis parameter, curve fitting using a super-lattice model is performed on the measured reflectance and the theoretical reflectance in $D_o[i]$ in the first wavelength range, and candidates $D_N[i]$ (where i=1, 2, . . . n) for the optimal solution of the film thickness of the second film 5 corresponding to $D_o[i]$ are acquired.

Figure 9:
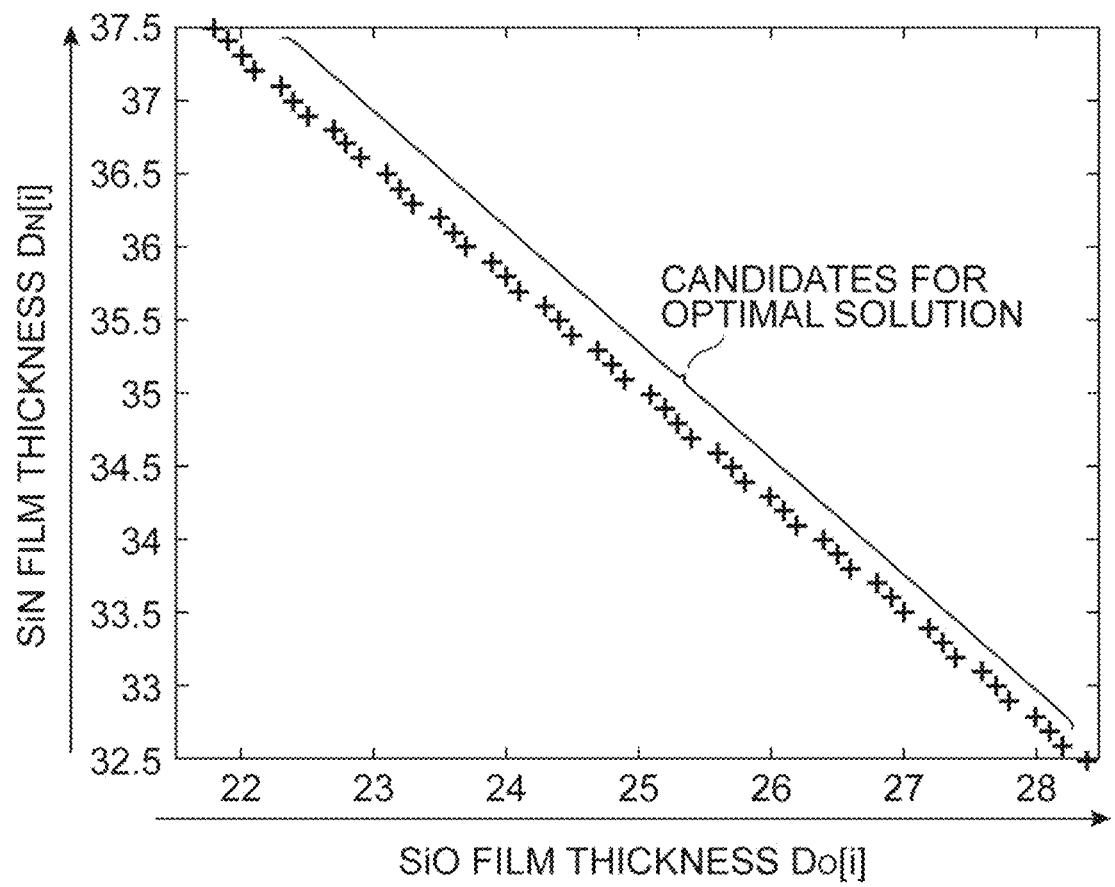
FIG. 9 is a diagram illustrating combinations of candidates for an optimal solution of the film thickness of the first film and candidates for an optimal solution of the film thickness of the second film.

FIG. 9 is a diagram illustrating combinations of candidates for the optimal solution of the film thickness of the first film 4 and candidates for the optimal solution of the film thickness of the second film 5. In the example illustrated in the drawing, combinations of the candidates for the optimal solutions when the reference search range in a measurement object S with 32 pairs of ONO structures (silicon oxide film: 25 nm/silicon nitride film: 35 nm/65 layers in total) is set to range from 32.5 nm to 37.5 nm are plotted at intervals of 0.1 nm. The intervals of the combinations of the candidates for the optimal solution may be set to be less in view of improvement in analysis accuracy, or the intervals of the combinations of the candidates for the optimal solution may be set to be greater in view of improvement in analysis speed. Since the candidates for the optimal solution are linearly disposed under the conditions in which the sums of the film thicknesses (optical thicknesses) of the first film 4 and the second film 5 are the same, other candidates may be estimated using a method such as linear approximation. In the example illustrated in FIG. 9, the search range of the film thickness of the first film 4 is set as the reference search range, but the search range of the film thickness of the second film 5 may be set as the reference search range.

In the optical solution determining step, the optimal solutions of the film thickness of the first film 4 and the film thickness of the second film 5 are determined out of the candidates for the optimal solutions using the result of comparison between the measured reflectance and the theoretical reflectance for each wavelength of the measurement object S in a second wavelength range which is different from the first wavelength range. The second wavelength range can be set to include a range in which the theoretical reflectance differs in the combinations in which the sums of the film thicknesses (optical thicknesses) of the first film 4 and the second film 5 are the same. The second wavelength range may include a wavelength range of shorter wavelengths than those of the first wavelength range or may include an ultraviolet range. Referring to FIG. 8, the second wavelength range may include a range of 200 nm to 300 nm or may include a range of 220 nm to 240 nm.

Figure 10:
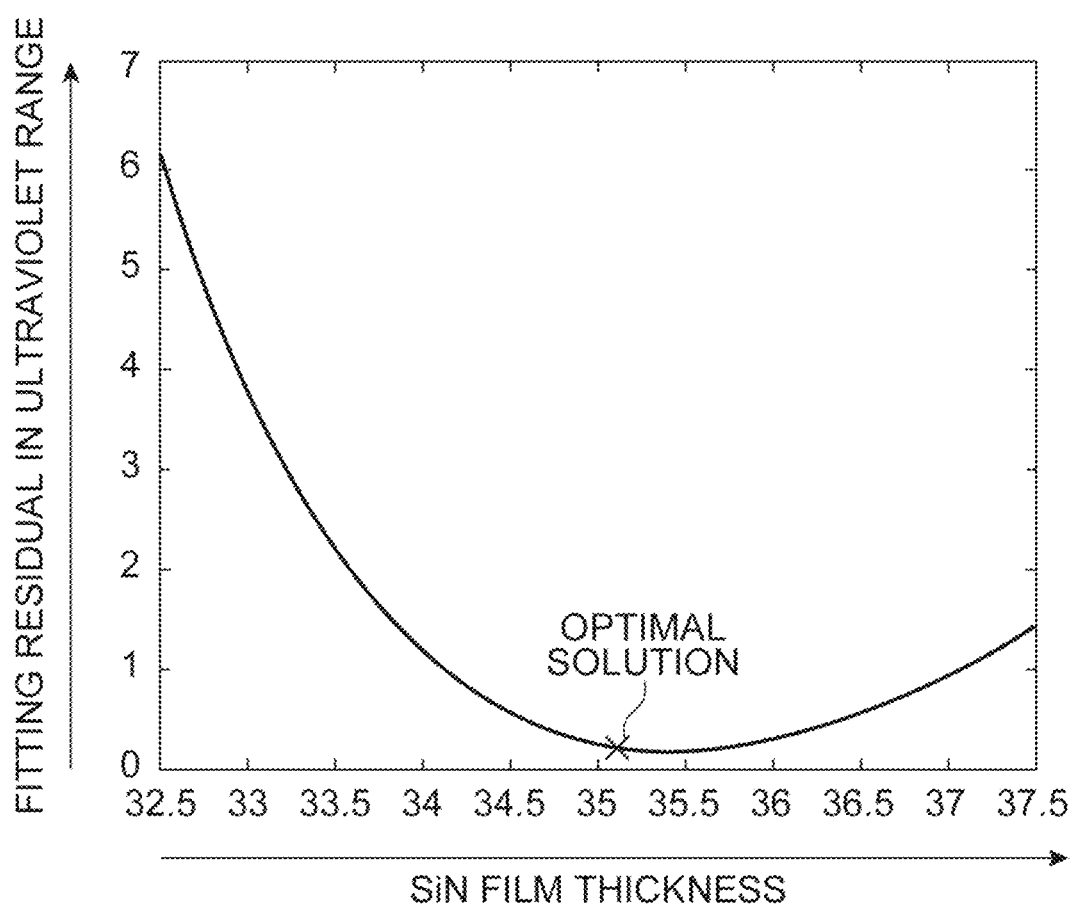
FIG. 10 is a diagram illustrating a scenario in which the optimal solutions are determined from the candidates for the optimal solutions illustrated in FIG. 9.

FIG. 10 is a diagram illustrating a scenario in which an optimal solution is determined out of the candidates for the optimal solution illustrated in FIG. 9. In the drawing, a relationship between the film thickness of the second film 5 and a fitting residual which is obtained by performing curve fitting using a super-lattice model on the measured reflectance and the theoretical reflectance in $D_o[i]$ and $D_N[i]$ in the second wavelength range is illustrated. In the example illustrated in FIG. 10, the number of minimum values of the fitting residual is only one, and it can be apparently understood that search for the optimal solution can be stably performed in comparison with the fitting residuals illustrated in FIGS. 4 to 6.

Figure 11:
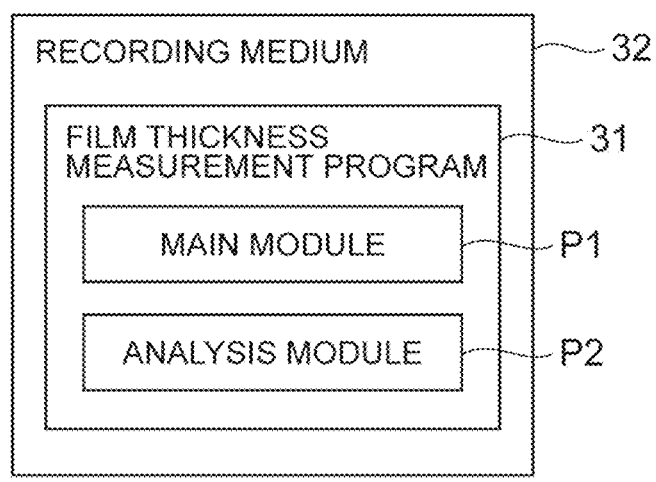
FIG. 11 is a block diagram illustrating an example of a film thickness measurement program and a recording medium.

FIG. 11 is a block diagram illustrating an example of a film thickness measurement program and a recording medium for causing a computer to serve as the analysis unit 15 of the film thickness measurement device 1. In the example illustrated in the drawing, a film thickness measurement program 31 includes a main module P1 and an analysis module P2. The main module P1 is a module that comprehensively controls the film thickness measuring operation. The function which is realized by the computer by executing the analysis module P2 is the same as the function of the analysis unit 15 of the film thickness measurement device 1. The film thickness measurement program 31 is provided, for example, by a computer-readable recording medium 32 such as a CD-ROM, a DVD, or a ROM or a semiconductor memory. The film thickness measurement program 31 may be provided as a computer data signal which is superimposed on carrier waves via a network.

As described above, in the film thickness measurement device 1, the optimal solutions of the film thickness of the first film 4 and the film thickness of the second film 5 are determined out of the candidates for the optimal solutions by comparing the measured reflectance and the theoretical reflectance using two different wavelength ranges. When the sums of the thicknesses of the first film 4 and the second film 5 are the same but the film thickness of the first film 4 and the film thickness of the second film 5 are different, there may be a difference between the theoretical reflectance in the first wavelength range and the theoretical reflectance in the second wavelength range. Accordingly, it is possible to rapidly and accurately perform measurement of film thicknesses on a measurement object S with a multi-layered film structure by acquiring the candidates for the optimal solutions using the first wavelength range and determining the optimal solutions out of the candidates for the optimal solutions using the second wavelength range. Since spectroscopy is used in the film thickness measurement device 1, there are few constraints on embodiments and the film thickness measurement device can be more easily applied to an in-line film thickness monitor in comparison with the cross-sectional observation technology.

In the film thickness measurement device 1, the comparison between the measured reflectance and the theoretical reflectance in the analysis unit 15 is performed on the basis of a super-lattice model in which it is assumed that the film thickness of the first film 4 and the film thickness of the second film 5 are constant in respective layers. By using the super-lattice model, it is possible to greatly decrease the number of analysis parameters which are used to determine the candidates for the optimal solutions and the optimal solutions and to decrease an analysis load. The problem in which there are many localized solutions even when the super-lattice model is used can be resolved through comparison between the measured reflectance and the theoretical reflectance using the two different wavelength ranges.

In the film thickness measurement device 1, the second wavelength range which is used in the analysis unit 15 includes a wavelength range of shorter wavelengths than those of the first wavelength range. A difference between the theoretical reflectance in the first wavelength range and the theoretical reflectance in the second wavelength range is likely to appear at a shorter wavelength. Accordingly, by causing the second wavelength range to include a wavelength range of shorter wavelengths than those of the first wavelength range, it is possible to more reliably determine the optimal solutions out of the candidates for the optimal solutions.

In the film thickness measurement device 1, the second wavelength range which is used in the analysis unit 15 includes an ultraviolet range. The difference between the theoretical reflectance in the first wavelength range and the theoretical reflectance in the second wavelength range is likely to appear in the ultraviolet range. Accordingly, by causing the second wavelength range to include the ultraviolet range, it is possible to more reliably determine the optimal solutions out of the candidates for the optimal solutions.

In the film thickness measurement device 1, the second wavelength range which is used in the analysis unit 15 includes a range of 200 nm to 300 nm. The difference between the theoretical reflectance in the first wavelength range and the theoretical reflectance in the second wavelength range is likely to appear in the range of 200 nm to 300 nm. Accordingly, by causing the second wavelength range to include the range of 200 nm to 300 nm, it is possible to more reliably determine the optimal solutions out of the candidates for the optimal solutions.

In the film thickness measurement device 1, the first wavelength range which is used in the analysis unit 15 may include a range of 300 nm to 800 nm. By causing the first wavelength range to include the range of 300 nm to 800 nm, it is possible to more reliably cause the difference between the theoretical reflectance in the first wavelength range and the theoretical reflectance in the second wavelength range to appear. Accordingly, by causing the first wavelength range to include the range of 300 nm to 800 nm, it is possible to more reliably determine the optimal solutions out of the candidates for the optimal solutions.

In the film thickness measurement device 1, transmitted light of the measurement light L1 which is transmitted by the measurement object S or reflected light of the measurement light L1 which is reflected by the measurement object S may be used as the detection light L2. In this case, it is possible to appropriately spectroscopically detect the detection light L2.

In the film thickness measurement device 1, the first film 4 is a silicon oxide film and the second film 5 is a silicon nitride film. In this case, it is possible to appropriately realize an in-line film thickness monitor for a device with a multi-layered film structure 6 such as a 3D-NAND memory.

Figure 12:
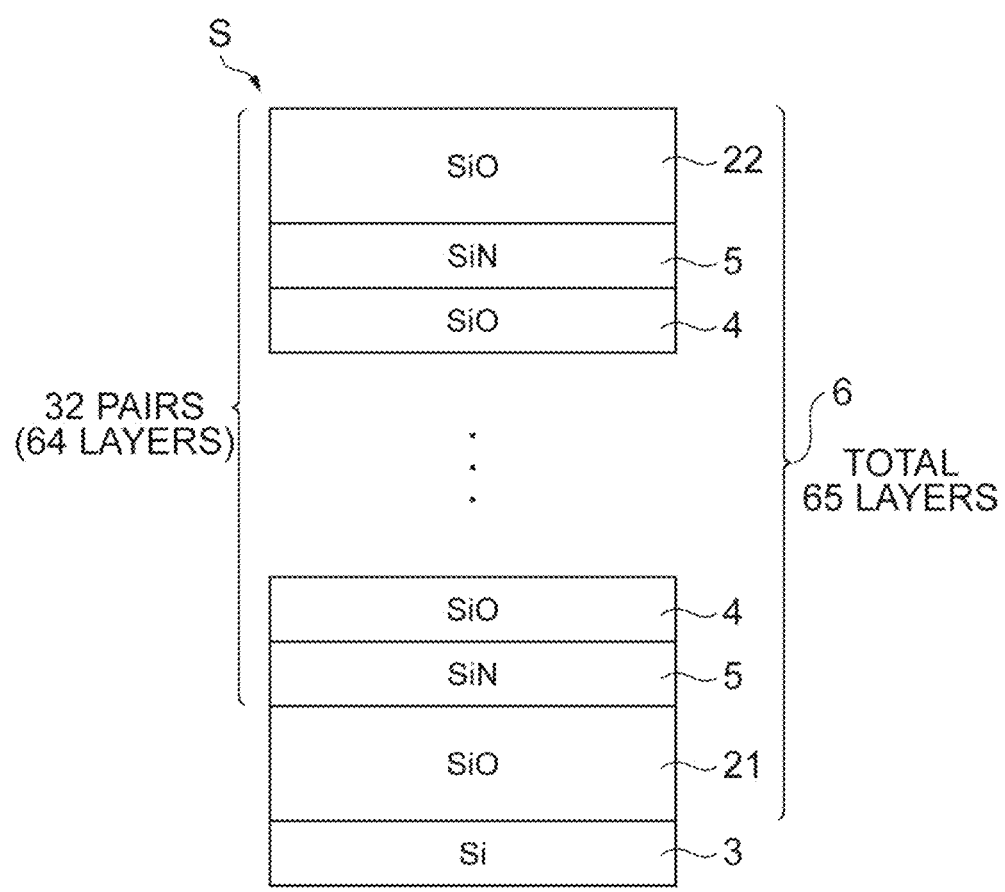
FIG. 12 is a diagram schematically illustrating another example of a layer configuration of a measurement object.

The present disclosure is not limited to the above embodiment. For example, in the embodiment, the measurement object S having the multi-layered film structure 6 of 32 pairs of the first film 4 and the second film 5 is exemplified as illustrated in FIG. 3, but the present disclosure may be applied to, for example, a measurement object S having a multi-layered film structure 6 in which a third film 21 and a fourth film 22 (both of which are silicon oxide films herein) with a film thickness greater than those of the first film 4 and the second film 5 of each pair are provided at stack ends as illustrated in FIG. 12. In this case, the above analysis can be performed using the film thickness of the third film 21 and the film thickness of the fourth film 22 as different analysis parameters and using a total of four analysis parameters.

The substrate 3 constituting the measurement object S is not limited to a silicon substrate, but may be a substrate formed of other materials such as quartz glass. The first film 4 and the second film 5 are not particularly limited, and preferably have 1) a configuration in which there is a constant difference in refractive index between the first film 4 and the second film 5 and 2) a configuration in which the first film 4 or the second film 5 has slight light-absorbing characteristics and the light-absorbing characteristics are not excessive in consideration of sensitivity or wavelength resolution of the spectroscopic detection unit 13. By 1), shift of the theoretical reflectance at a shorter wavelength illustrated in FIG. 8 occurs sufficiently. By 2), it is possible to prevent interception of light in the vicinity of the surface of the multi-layered film structure 6 even when the number of pairs of the first film 4 and the second film 5 is great and to secure detection of detection light L2 with a satisfactory intensity.

An example of the combination of the first film 4 and the second film 5 is a combination of an oxide film and a niobium oxide film on a glass substrate in addition to the silicon oxide film and the silicon nitride film. In this case, for example, it is preferable that the first wavelength range include a range of 300 nm to 800 nm. For example, it is also preferable that the second wavelength range include a range of 200 nm to 300 nm.

REFERENCE SIGNS LIST

1 . . . Film thickness measurement device, 3 . . . Substrate, 4 . . . First film, 5 . . . Second film, 12 . . . Light output unit, 13 . . . Spectroscopic detection unit, 15 . . . Analysis unit, 31 . . . Film thickness measurement program, 32 . . . Recording medium, L1 . . . Measurement light, L2 . . . Detection light, S . . . Measurement object

The invention claimed is:

1. A film thickness measurement device measuring a film thickness of a first film and a film thickness of a second film in a measurement object in which the first film and the second film are repeatedly alternately stacked on a substrate, the film thickness measurement device comprising:
 a light source configured to output measurement light to the measurement object;
 a spectroscopic detector configured to spectroscopically detect detection light from the measurement object; and
 an analyzer configured to compare a measured reflectance for each wavelength of the measurement object which is acquired from a result of detection by the spectroscopic detector with a theoretical reflectance and to analyze the film thickness of the first film and the film thickness of the second film,
 wherein the analyzer is configured to:
 acquire candidates for optimal solutions of the film thickness of the first film and the film thickness of the second film using a result of comparison between the measured reflectance and the theoretical reflectance for each wavelength of the measurement object in a first wavelength range; and
 determine the optimal solutions of the film thickness of the first film and the film thickness of the second film out of the candidates for the optimal solutions using a result of comparison between the measured reflectance and the theoretical reflectance for each wavelength of the measurement object in a second wavelength range which is different from the first wavelength range.

2. The film thickness measurement device according to claim 1, wherein the comparison between the measured reflectance and the theoretical reflectance in the analyzer is performed on the basis of a super-lattice model in which it is assumed that the film thickness of the first film and the film thickness of the second film are constant in respective layers.

3. The film thickness measurement device according to claim 1, wherein the second wavelength range which is used in the analyzer includes a wavelength range of shorter wavelengths than those of the first wavelength range.

4. The film thickness measurement device according to claim 1, wherein the second wavelength range which is used in the analyzer includes an ultraviolet range.

5. The film thickness measurement device according to claim 1, wherein the second wavelength range which is used in the analyzer includes a range of 200 nm to 300 nm.

6. The film thickness measurement device according to claim 1, wherein the first wavelength range which is used in the analysis unit includes a range of 300 nm to 800 nm.

7. The film thickness measurement device according to claim 1, wherein transmitted light of the measurement light which is transmitted by the measurement object or reflected light of the measurement light which is reflected by the measurement object is used as the detection light.

8. The film thickness measurement device according to claim 1, wherein the first film is a silicon oxide film and the second film is a silicon nitride film.

9. A film thickness measurement method of measuring a film thickness of a first film and a film thickness of a second film in a measurement object in which the first film and the second film are repeatedly alternately stacked on a substrate, the film thickness measurement method comprising:
 outputting measurement light to the measurement object;
 spectroscopically detecting detection light from the measurement object; and
 comparing a measured reflectance for each wavelength of the measurement object which is acquired from a result of spectroscopic detection with a theoretical reflectance and analyzing the film thickness of the first film and the film thickness of the second film,
 wherein the comparing and analyzing includes:
 acquiring candidates for optimal solutions of the film thickness of the first film and the film thickness of the second film using a result of comparison between the measured reflectance and the theoretical reflectance for each wavelength of the measurement object in a first wavelength range; and
 determining the optimal solutions of the film thickness of the first film and the film thickness of the second film out of the candidates for the optimal solutions using a result of comparison between the measured reflectance and the theoretical reflectance for each wavelength of the measurement object in a second wavelength range which is different from the first wavelength range.

10. The film thickness measurement method according to claim 9, wherein the comparison between the measured reflectance and the theoretical reflectance in the comparing and analyzing is performed on the basis of a super-lattice model in which it is assumed that the film thickness of the first film and the film thickness of the second film are constant in respective layers.

11. The film thickness measurement method according to claim 9, wherein the second wavelength range which is used in the comparing and analyzing includes a wavelength range of shorter wavelengths than those of the first wavelength range.

12. The film thickness measurement method according to claim 9, wherein the second wavelength range which is used in the comparing and analyzing includes an ultraviolet range.

13. The film thickness measurement method according to claim 9, wherein the second wavelength range which is used in the comparing and analyzing includes a range of 200 nm to 300 nm.

14. The film thickness measurement method according to claim 9, wherein the first wavelength range which is used in the comparing and analyzing includes a range of 300 nm to 800 nm.

15. The film thickness measurement method according to claim 9, wherein transmitted light of the measurement light which is transmitted by the measurement object or reflected light of the measurement light which is reflected by the measurement object is used as the detection light.

16. The film thickness measurement method according to claim 9, wherein the first film is a silicon oxide film and the second film is a silicon nitride film.

17. A non-transitory computer-readable recording medium having a film thickness measurement program for measuring a film thickness of a first film and a film thickness of a second film in a measurement object in which the first film and the second film are repeatedly alternately stacked on a substrate, the film thickness measurement program causing a computer to serve as an analyzer configured to compare a measured reflectance for each wavelength of the measurement object which is acquired from a result of detection by a spectroscopic detection unit with a theoretical reflectance and to analyze the film thickness of the first film and the film thickness of the second film, wherein the analyzer is caused to perform:

acquiring candidates for optimal solutions of the film thickness of the first film and the film thickness of the second film using a result of comparison between the measured reflectance and the theoretical reflectance for each wavelength of the measurement object in a first wavelength range; and determining the optimal solutions of the film thickness of the first film and the film thickness of the second film out of the candidates for the optimal solutions using a result of comparison between the measured reflectance and the theoretical reflectance for each wavelength of the measurement object in a second wavelength range which is different from the first wavelength range.

* * * * *